F. E. LEE.
EGG CANDLING MACHINE.
APPLICATION FILED SEPT. 10, 1913.

1,111,595.

Patented Sept. 22, 1914
3 SHEETS—SHEET 1.

Witnesses:
Christ Feinle, Jr.
John J. McCarthy

Inventor:
Fred E. Lee.
By Victor J. Evans,
Attorney.

F. E. LEE.
EGG CANDLING MACHINE.
APPLICATION FILED SEPT. 10, 1913.

1,111,595.

Patented Sept. 22, 1914.

3 SHEETS—SHEET 3.

Witnesses:
Christ Feinle, Jr.
John J. McCarthy

Inventor,
Fred E. Lee.
By Victor J. Evans,
Attorney.

UNITED STATES PATENT OFFICE.

FREDERICK ELMER LEE, OF GRAND FORKS, NORTH DAKOTA.

EGG-CANDLING MACHINE.

1,111,595.  Specification of Letters Patent.  Patented Sept. 22, 1914.

Application filed September 10, 1913. Serial No. 789,141.

*To all whom it may concern:*

Be it known that I, FREDERICK E. LEE, a citizen of the United States, residing at Grand Forks, in the county of Grand Forks and State of North Dakota, have invented new and useful Improvements in Egg-Candling Machines, of which the following is a specification.

This invention relates to improvements in egg candling or testing machines for determining the fertility or quality of eggs and has particular application to machines of that type whereby a plurality of eggs may be tested or candled simultaneously.

In carrying out the present invention, it is my purpose to provide a machine of the class described whereby the eggs may be candled conveniently, rapidly and accurately and whereby a plurality of eggs, for instance, one dozen, may be tested simultaneously. It is also my purpose to provide a machine of the type set forth which will embrace the desired features of simplicity, efficiency and durability, one whereby the eggs may be candled without the danger of breaking and one which may be manufactured and maintained at a minimum expense.

Furthermore, I aim to provide an egg testing machine which will embody in its construction among other features a reflector and a conveyer traversing a path above the reflector and designed to carry the eggs across the reflector, a source of light being provided and disposed above the conveyer so that the same will pass through the eggs and reflect the images of the latter within the mirror thereby enabling the "candler" to view the eggs and determine the quality thereof with accuracy.

With the above and other objects in view, the invention consists in the construction, combination and arrangement of parts hereinafter set forth in and falling within the scope of the claims.

Figure 1:
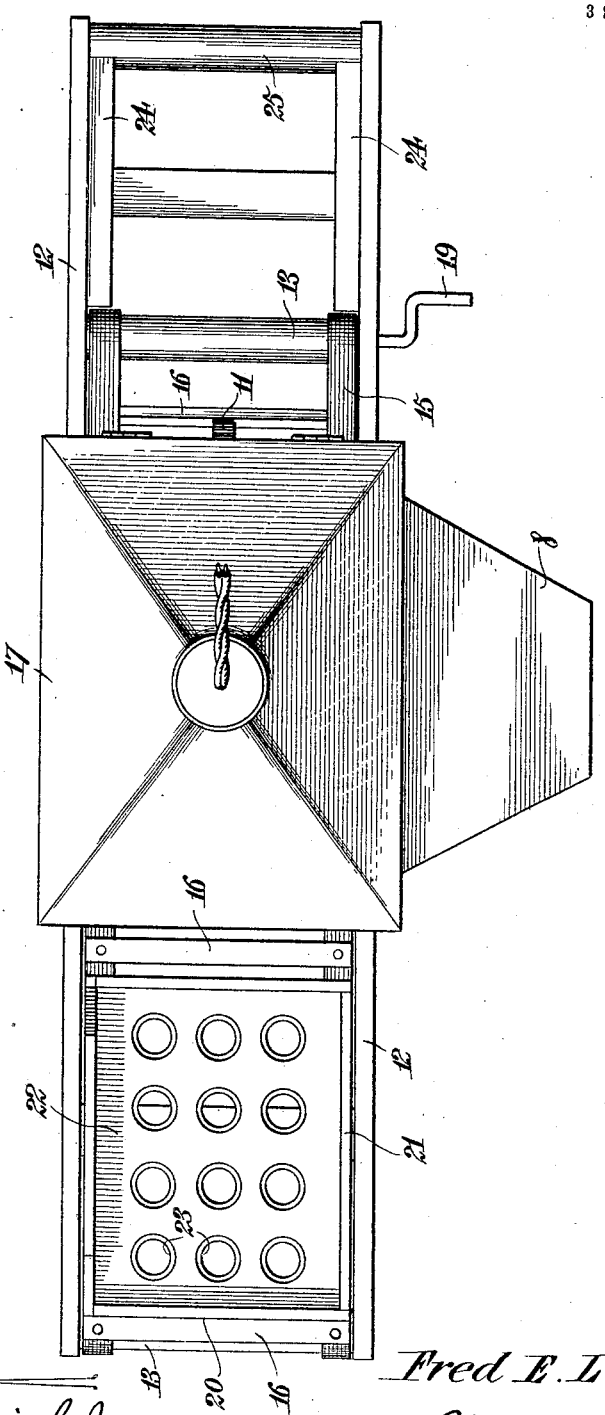
Figure 2:
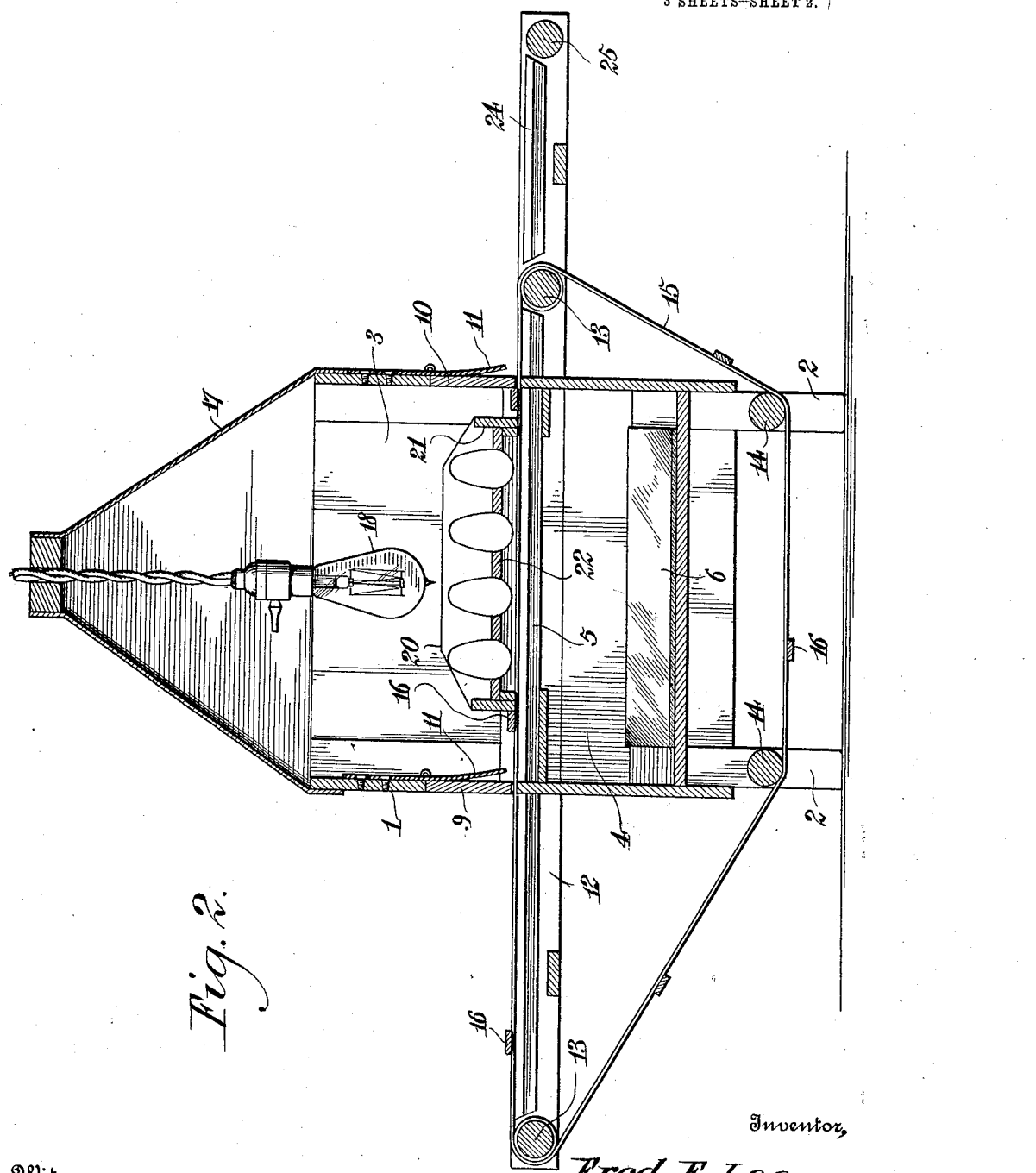
Figure 3:
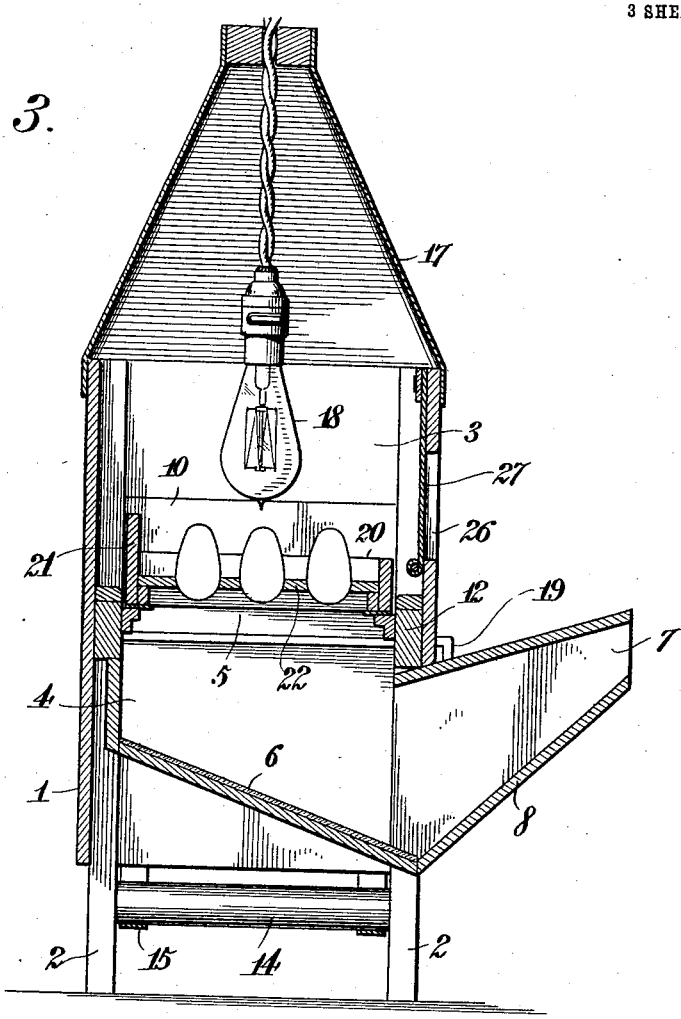
Figure 4:
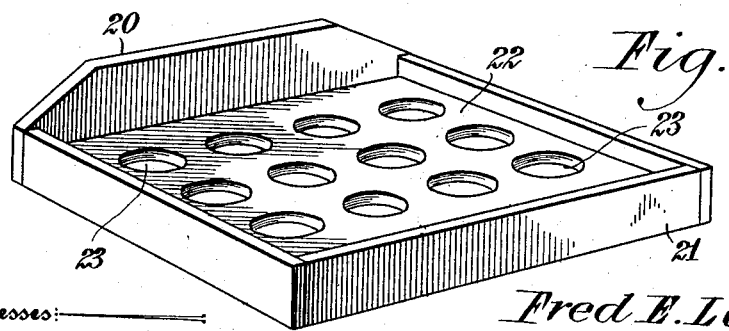

In the accompanying drawings; Figure 1 is a top plan view of a candling machine constructed in accordance with the present invention. Fig. 2 is a central longitudinal sectional view therethrough. Fig. 3 is a transverse sectional view of the same. Fig. 4 is a perspective view of one of the trays for the eggs.

Referring now to the accompanying drawings in detail, the numeral 1 designates a casing constructed of any suitable material and preferably of box-like form and equipped with depending legs 2. This casing is divided into top and bottom chambers 3 and 4 respectively and the top wall of the bottom chamber is formed with a rectangular opening 5 establishing communication between the top and bottom chambers of the casing. Suitably secured to the bottom of the lower chamber 4 and inclined downwardly toward the front wall of such chamber is a mirror or reflector 6 while formed in the front wall of the casing is a sight opening 7 equipped with a hood 8 by means of which the mirror may be brought into the line of vision of the "candler." The opposite end walls of the upper chamber 3 are provided with vertically movable swinging doors 9, 10 normally held in closed position by means of leaf springs 11, the door 9 opening inwardly of the respective chamber while the door 10 opens outwardly thereof.

Arranged longitudinally of the chambers and interposed between the same is a conveyer frame 12 extending beyond the opposite end of the casing and having journaled in the opposite extremities thereof rollers 13, 13 over which, and rollers 14, 14 journaled in the legs 2 of the casing at the opposite ends of the latter is trained an endless conveyer belt 15 equipped with cross bars 16 appropriately spaced apart. Suitably fastened to the upper end of the top chamber 3 and closing such end is a canopy 17 containing a suitable source of light, such source being, in the present instance, in the form of an electric lamp 18 connected in circuit with a source of current.

In the present instance, one of the rollers 13 is equipped with a crank handle 19 whereby motion may be imparted to the respective roller so that the conveyer belt will be actuated and the latter is adapted to carry the eggs from the inlet side of the conveyer frame into the casing, across the reflector therein and out of the casing by way of the delivery end thereof. In order that the eggs may be safely and conveniently placed upon the belt, I employ trays 20 designed to be placed upon the belt one after the other so that the eggs contained therein will be successively carried into and out of the casing so that the same may be candled.

In this form of my invention, each tray comprises a substantially rectangular frame 21 provided with a bottom 22 having a group of apertures 23 formed therein to receive the eggs. The capacity of the trays, in this instance, is one dozen each, but it is to be understood that the trays may be changed, as to size, so that the capacity thereof may be varied, the dimensions of the casing and other parts of the machine being correspondingly varied so as to accommodate the trays.

The delivery end of the conveyer frame 12 has connected thereto a platform 24 of any suitable construction and designed to receive the trays from the conveyer belt 15 as such trays are carried out of the upper chamber. This platform is preferably provided at its free end with a roller 25 to facilitate the removal of the trays therefrom. The front wall of the top chamber 3 is equipped with a sight opening 26 normally closed by means of a curtain 27 and designed for the purpose of permitting the candler to view the interior of the upper chamber to determine the position of the trays therein and for other purposes.

In operation, the eggs are placed within the trays and the latter disposed upon the conveyer belt 15 in advance of the cross bars 16 on such belt. The crank handle 19 is now rotated and the belt caused to traverse a path between the reflector and the source of light thereby carrying the eggs into the upper chamber by way of the door 9, across the reflector, and outwardly of the upper chamber by way of the door 10, the trays being delivered onto the platform 24 from the delivery end of the belt. As the trays register with the opening 5 in the top wall of the bottom chamber, the rays of light from the source within the canopy pass through such ends and reflect images of the latter within the mirror so that the "candler", by looking into the hood 8 may readily determine the fertility of the eggs.

It will, of course, be understood that the bottom of each tray is opaque so that the rays of light can only pass through the eggs.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. An egg candling machine comprising a casing divided into superposed chambers, the lower chamber having one side wall thereof formed with a sight opening, a reflector within the bottom of the lower chamber, doors closing the opposite ends of the upper chamber, a conveyer frame arranged longitudinally of and between said chambers and extending between the opposite sides thereof, a conveyer belt on said frame and adapted to carry the eggs into the upper chamber by way of one of said doors, across said reflector, and out of the respective chamber by way of the remaining door, and a source of light above said conveyer.

2. An egg candling machine comprising a casing, a reflector within said casing, a source of light within said casing above said reflector, means traversing a path between said reflector and source of light and adapted to carry the eggs across the reflector, and doors operable automatically in the operation of said means and disposed at the intake and delivery ends of the casing.

In testimony whereof I affix my signature in presence of two witnesses.

FREDERICK ELMER LEE.

Witnesses:
S. C. HENDRICKSON,
OSCAR MOEN.